Patented Sept. 8, 1942

2,294,893

UNITED STATES PATENT OFFICE 2,294,893

DYE FOR PHOTOGRAPHIC LAYERS

Burt H. Carroll and Jonas John Chechak, Rochester, N. Y., assignors to Eastman Kodak Company, Rochester, N. Y., a corporation of New Jersey No Drawing. Application May 7, 1940, Serial No. 333,807

2 Claims. (Cl. 95—6)

This invention relates to photography and particularly to azo dyes for incorporation in photographic layers.

It is well known that dyes used in photography should remain in the layers in which they are incorporated. Many of the dyes which have been proposed for use in photographic layers either wander from the layer in which they are incorporated or if they are sufficiently non-diffusing in photographic layers cannot be bleached or removed from the layers during processing. Filter dyes, antihalation dyes and image-forming dyes, for example, should remain in the layer in which they are incorporated until it is desired to remove them during processing of the photographic element in which they are incorporated. Many dyes hitherto used are objectionable because of the tendency to diffuse from one layer to another. Such wandering may sometimes be prevented by precipitating the dyes with organic bases although this method of rendering the dyes non-diffusing has the disadvantage of increasing the cost of preparing the dye layers and frequently makes the incorporation of a sufficient concentration of the dyes difficult owing to a tendency for the dye and the precipitate to separate out in crystals or flakes.

Azo dyes are, in general, desirable for use in coloring photographic layers because they are relatively light stable and may be decolorized by suitable treatment of the film. It has previously been thought that direct cotton dyes may be used to color photographic gelatin layers and that such dyes do not diffuse from the layers. However, we have found that this is not necessarily true in general.

It is, therefore, an object of the present invention to provide photographic layers having dyes which do not diffuse through set gelatin or which will diffuse only very slightly. A further object is to provide dyes for color photography which can be bleached readily by the use of suitable bleaching agents. Other objects will appear from the following description of our invention.

These objects are accomplished by the use of azo dyes made by tetrazotizing symmetrical aromatic diamines having certain substituent groups ortho to the amino groups and coupling them with phenols or naphthols in which the position para to the hydroxyl group of the phenol or naphthol is blocked so that coupling must take place ortho to the hydroxyl group.

These dyes are formed from symmetrical aromatic diamines containing alkyl or halogen substituents in the positions in the aromatic nuclei ortho to the amino groups. These diamine bases are tetrazotized in the usual way using any known diazotizing reaction and are then coupled with a phenol or α-naphthol in which the position para to the hydroxyl group is blocked or in the case of some naphthols inhibited by 3 or 5 substitution so that coupling takes place ortho to the hydroxyl. Aromatic diamines suitable for this purpose are ortho tolidine, ortho tolidine disulfonic acid, 4,4'-diaminostilbene disulfonic acid ortho dichlorbenzidine, 4,4'-diamino-3,3'-dimethyldiphenylmethane, and 4,4'-diamino-3,3'-dichlorodiphenyl urea. Phenols and naphthols suitable for use in the coupling reaction are 2-chloro-5-hydroxytoluene, p-cresol-2-sulfonic acid or 1-naphthol-8-chloro-3,6-disulfonic acid. The amino naphthols may contain acyl substituents on the nitrogen of the naphthol. The acyl group may contain a straight carbon chain or a branched carbon chain such as isopropyl, isobutyl and secondary or tertiary amyl. These long chain acyl groups tend to decrease diffusion of the dye.

The dyes which we propose to use may have the following general formula:

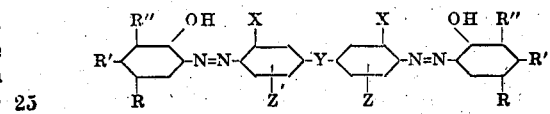

in which

X = halogen or alkyl
Y = chemical bond
   —NH—CO—NH—
   —CH=CH—
   —(CH$_2$)$_n$— where $n$ is a positive integer
Z = any substituent, such as alkyl, halogen, sulfonic acid, carboxyl
R = any substituent group other than carboxyl
R' and R'' = hydrogen, a substituent group, the atoms necessary to complete a second benzene ring, which may contain sulfonic acid, amino, or acylamino groups The following examples, which are illustrative only, indicate dyes which are suitable for use according to our invention:

Example 1

The dye made by tetrazotizing 1 mol of ortho tolidine disulfonic acid and coupling it in alkaline medium with 2 mols of 2-chloro-5-hydroxytoluene has the following structure:

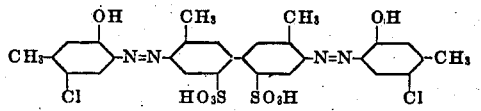

Example 2

The dye made by tetrazotizing 1 mol of ortho tolidine and coupling it in an alkaline medium with 2 mols of p-phenol sulfonic acid has the following structure:

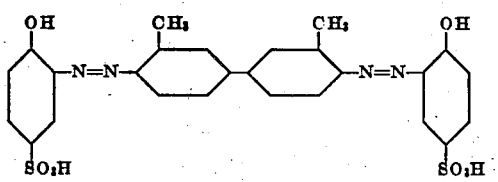

*Example 3*

The dye made by tetrazotizing 1 mol of ortho tolidine and coupling it in an alkaline medium with 2 mols of α-naphthol-4-sulfonic acid has the following structure:

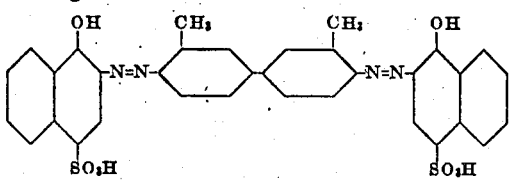

The dyes which we propose to use may be incorporated in filter overcoats, overcoats or interlayers in photographic films, plates or paper.

In certain cases the dyes which we propose to use may be bleached throughout in suitable alkaline bleaching solutions such as alkaline stannous chloride.

Although the specific dyes which we have described are magenta or yellow in color, we are not limited to dyes of these hues as dyes of other colors may be formed by our invention for use in photographic layers.

Dyes of the structure which we have described are practically non-diffusing in gelatin and have no adverse effect on the sensitivity of adjacent emulsion layers. When used in filter or antihalation layers they may be discharged by the use of sodium hydrosulfite or potassium permanganate. By forcing coupling of the tetrazotized aromatic diamine with a phenol or naphthol ortho to the hydroxyl group of the phenol or naphthol, dyes are produced which have sharper absorption spectra, that is which absorb more completely in one spectral region and less in other spectral regions.

The dyes which we have proposed have high water solubility, thus facilitating the preparation of dyed layers of adequate dye density without crystallization of the dye. In general, the dyes may contain substituent groups other than those specified above although they may not be substituted with a large number of solubilizing groups or their diffusion tendency will be increased. For example, some of the dyes might be made to diffuse by introducing an excessive number of sulfonic acid groups. This fact is well known in the dye art and we do not intend to include within the scope of our invention dyes containing an excess number of solubilizing groups which would increase the diffusion tendency. In general, dyes having two to four sulfonic acids in the molecule are sufficiently soluble and do not diffuse from gelatin. However, even with dyes containing more than four sulfonic acid groups the diffusion tendency may be reduced by various expedients such as acylation of amino groups or etherification or esterification of hydroxyl groups other than those ortho to the azo group.

It is to be understood that the specific examples included herein are illustrative only and that our invention is to be taken as limited only by the scope of the appended claims.

We claim:

1. A photographic element including a light-sensitive gelatino-silver halide layer and a gelatin layer containing a dye formed by tetrazotizing a symmetrical aromatic diamine having alkyl groups ortho to the amino groups and coupling it ortho to the hydroxyl group with a phenol containing a substituent group para to its hydroxyl group.

2. A photographic element including a light-sensitive gelatino silver halide layer and adjacent thereto a gelatin filter layer containing a dye formed by tetrazotizing a symmetrical aromatic diamine having alkyl groups ortho to the amino groups and coupling it ortho to the hydroxyl group with a phenol containing a substituent group para to its hydroxyl group.

BURT H. CARROLL.
JONAS JOHN CHECHAK.